United States Patent [19]

Capraro

[11] Patent Number: 5,215,318
[45] Date of Patent: Jun. 1, 1993

[54] BODY TRAILER

[76] Inventor: Anthony L. Capraro, 51 Canon Dr., Staten Island, N.Y. 10314

[21] Appl. No.: 557,467

[22] Filed: Jul. 25, 1990

[51] Int. Cl.⁵ .................... B62D 51/04; B62B 1/00
[52] U.S. Cl. ...................... 280/1.5; 280/47.26; 280/204; 280/DIG. 4
[58] Field of Search .............. 280/1.5, 3, 836, DIG. 3, 280/DIG. 4, 37, 19, 46, 43.1, 47.26, 204, 47.2, 47.18

[56] References Cited

U.S. PATENT DOCUMENTS

| | | | |
|---|---|---|---|
| 2,820,643 | 1/1958 | Cohn | 280/47.2 |
| 3,328,043 | 6/1967 | Johnson | 280/1.5 |
| 3,912,290 | 10/1975 | Rich | 280/19 |
| 3,997,181 | 12/1976 | Jaco et al. | 280/47.26 |
| 4,262,928 | 4/1981 | Leitzel | 280/47.26 |
| 4,440,410 | 4/1984 | Bradshaw | 280/47.26 |
| 4,836,565 | 6/1989 | Catalo | 280/47.26 |
| 4,842,289 | 6/1989 | Samuels | 280/47.26 |

FOREIGN PATENT DOCUMENTS 0412119 4/1910 France ................... 280/1.5

Primary Examiner—Margaret A. Focarino
Assistant Examiner—Paul Dickson
Attorney, Agent, or Firm—Richard L. Miller

[57] ABSTRACT

A body trailer is provided and consists of a housing having a compartment for storing various items, with a door hinged to the housing for covering the compartment. A pair of wheels are mounted on one end of the housing, while a mechanism is mounted on other end of the housing for towing the body trailer behind a person, with the wheels rolling along the ground.

4 Claims, 2 Drawing Sheets

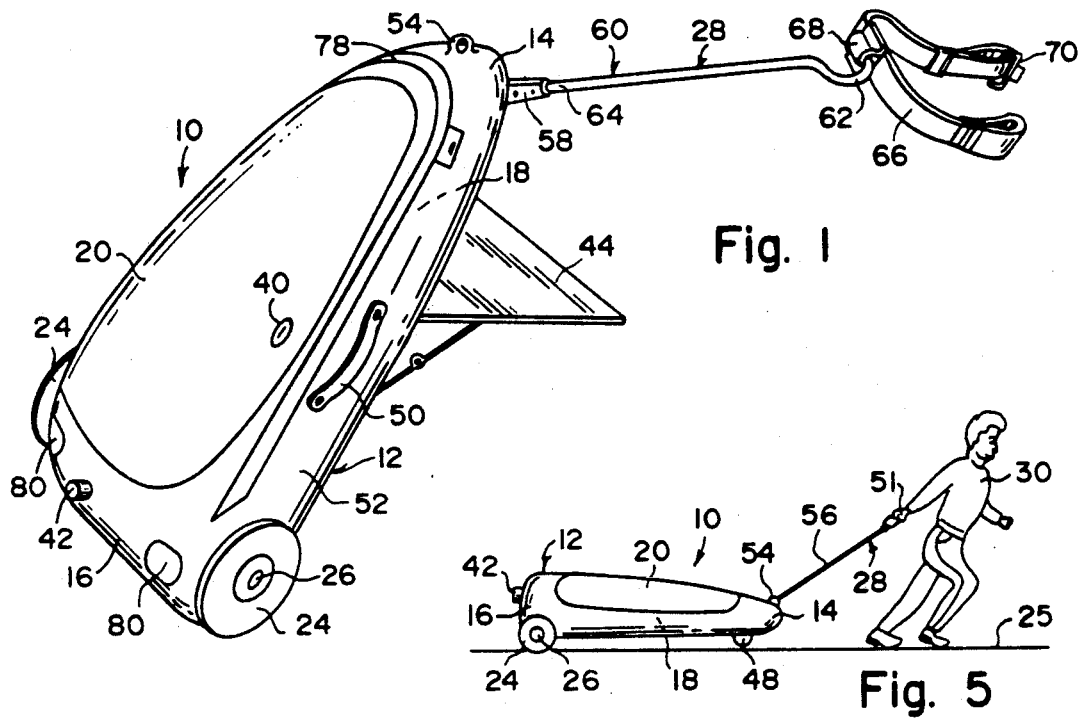
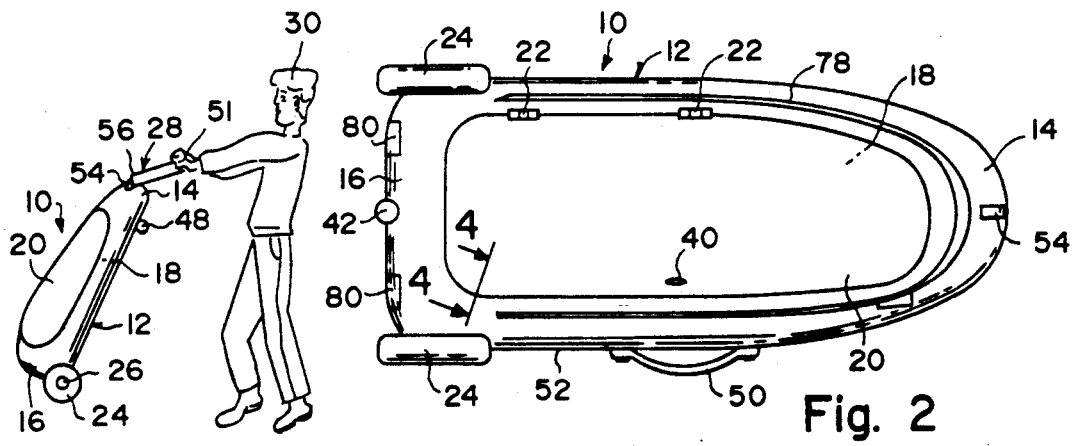
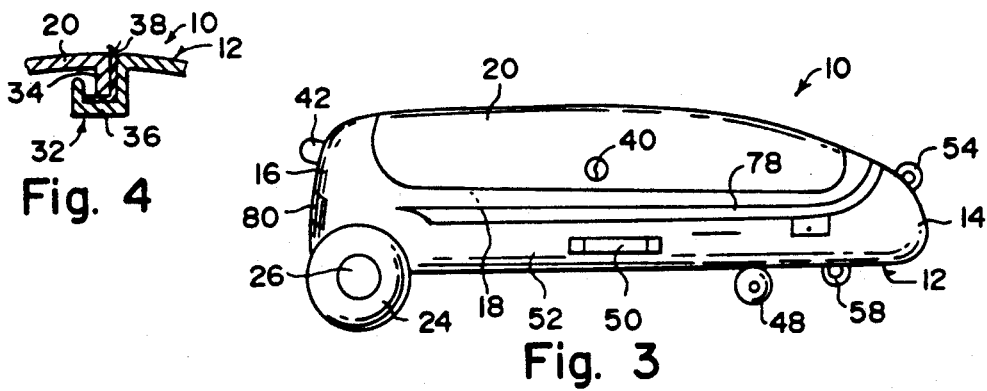

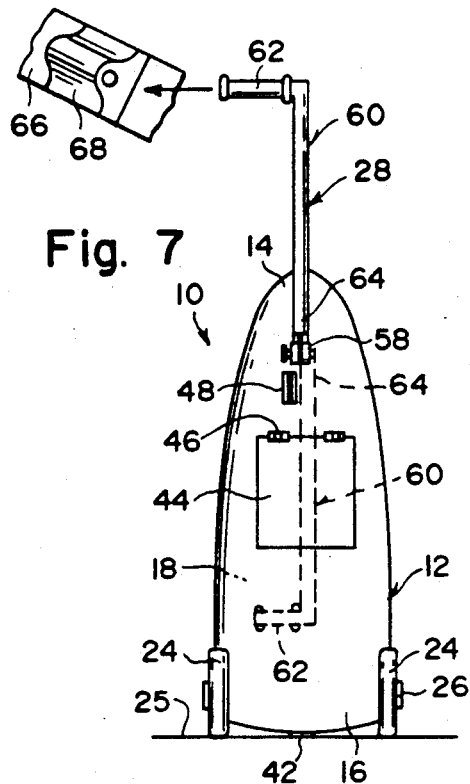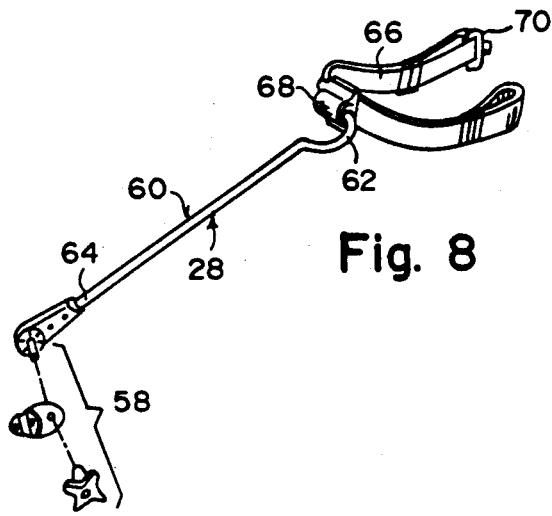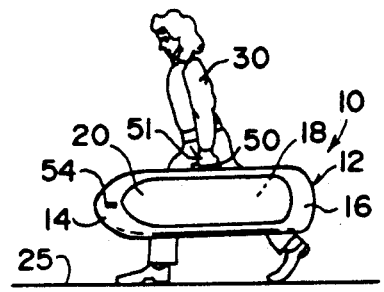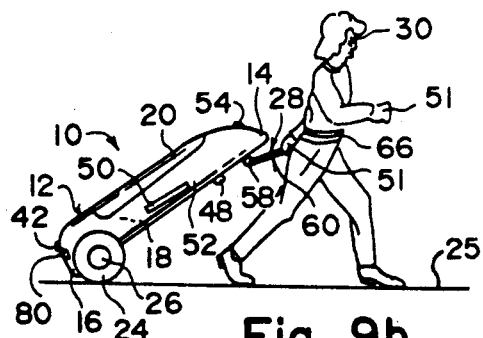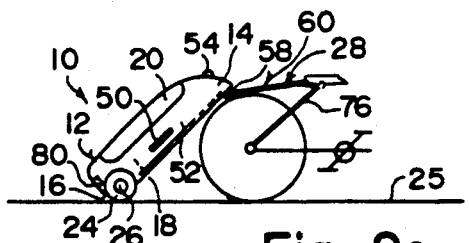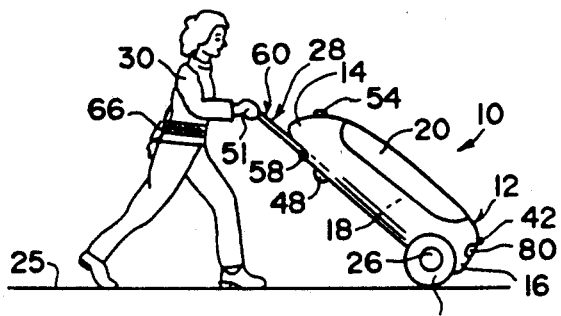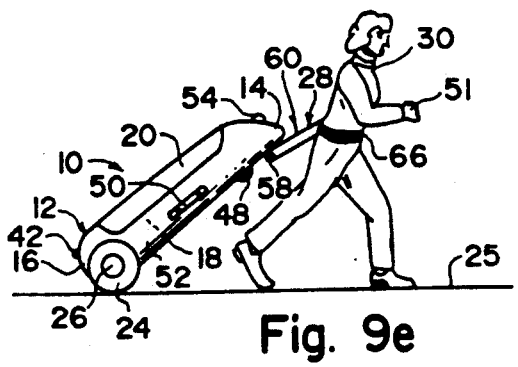

under the proximal end 14 of the housing 12 so that the body trailer 10 can be towed in a horizontal position on the ground 25. A
BODY TRAILER

BACKGROUND OF THE INVENTION

The instant invention relates generally to vehicle pulling devices and more specifically it relates to a body trailer.

Numerous vehicle pulling devices have been provided in the prior art that are adapted to be attached to the body of a person so that the person can tow the vehicle behind. For example, U.S. Pat. No. 2,613,953 to Giovannoni; U.S. Pat. No. 4,236,723 to Lemmon and U.S. Pat. No. 4,838,565 to Douglas et al all are illustrative of such prior art. While these units may be suitable for the particular purpose to which they address, they would not be as suitable for the purpose of the present invention as hereafter described.

SUMMARY OF THE INVENTION

A primary object of the present invention is to provide a body trailer that will overcome the shortcomings of the prior art devices.

Another object is to provide a body trailer that can carry heavy loads with a minimum of strength required by the traveler, since the body trailer rolls along on wheels.

An additional object is to provide a body trailer that affords hands free travel, since a towing hitch of the body trailer can be strapped to the waist of the traveler.

A further object is to provide a body trailer that is simple and easy to use.

A still further object is to provide a body trailer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the instant invention per se;

FIG. 2 is a top elevational view thereof;

FIG. 3 is a side view thereof;

FIG. 4 is a cross sectional view with parts broken away taken on line 4-4 of FIG. 2;

FIGS. 5 and 6 are diagrammatic views illustrating the instant invention in use;

FIG. 7 is a diagrammatic bottom elevational view of the instant invention with a modified portion of the towing hitch;

FIG. 8 is a perspective view illustrating the towing hitch in greater detail; and FIGS. 9a, 9b, 9c, 9d and 9e are additional diagrammatic views illustrating other ways of utilizing the instant invention.

DETAILED DESCRIPTION OF THE PREFERRED EMBODIMENTS

Turning now descriptively to the drawings, in which like reference characters denote like elements throughout the several views, the Figures illustrates a body trailer 10 consisting of a housing 12 with a proximal end 14 and a distal end 16 having a compartment 18 therebetween for storing various items. A door 20 is hinged at 22 to the housing 12 for covering the compartment 18. A pair of wheels 24 are mounted by an axel 26 on the distal end 16 of the housing 12. A mechanism 28 is mounted on the proximal end 14 of the housing 12, for towing the body trailer 10 behind a person 30, with the wheels 24 rolling along the ground 25.

A sealing mechanism 32, as shown in FIG. 4, is for sealing the door 20 when the door 20 is in a closed position on the housing 12 to prevent moisture and dust from entering the compartment 18. The mechanism 32 is a tongue 34 on the door, a groove 36 on the housing 12 with a gasket 38 therebetween. A locking mechanism 40, being a key lock, is for locking the door 20 when the door 20 is in the closed position on the housing 12 to prevent unauthorized entry into the compartment 18.

A foot 42 is on the distal end 16 of the housing 12 so that when the housing 12 is placed in a vertical position, the foot 42 will rest on the ground 25 to stabilize the housing 12. A collapsible table 44 is hinged at 46.

An auxiliary wheel 48 is mounted under the proximal end 14 of the housing 12 so that the body trailer 10 can be towed in a horizontal position on the ground 25. A handle 50 is mounted to one side 52 of the housing 12 so that the body trailer 10 can be easily carried by a hand 51 of the person 30 as shown in FIG. 9a in a suitcase like fashion.

The towing mechanism 28, can be an eye 54 affixed to the top of the proximal end 14 of the housing 12. A lanyard 56 is connected to the eye 54 so that the person 30 can grip the lanyard 56 by the hand 51 for towing the trailer body 10 on the ground 25 as shown in FIGS. 5 and 6. The towing mechanism 28, can be a locking ratchet bracket 58 mounted on the bottom of the proximal end 14 of the housing 12. An elongated arm 60 having a bent proximal end 62 and a straight distal end 64 connected to the locking ratchet bracket 58 so that the person 30 can grip by the hand 51 the bent proximal end 62 of the elongated arm 60 for towing or pushing the trailer body 10 as shown in FIGS. 9b and 9d respectively.

A belt 66 can be provided having a sleeve 68 and a quick release buckle 70 thereon. The sleeve 68 receives the bent proximal end 62 of the elongated arm 60 while the quick release buckle 70 can be placed in engagement when the belt 66 is placed about the waist 72 of the person 30 so that the peron 30 can tow the trailer body 10 while their hands 51 are kept free as shown in FIG. 9e. The elongated arm 60 can also be connected directly to a bicycle frame 76 as shown in FIG. 9c.

The housing 12 can also contain a reflector tape 78 and a pair of battery power lights 80 mounted in the distal end 16 to make the body trailer 10 more visible at night.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A body trailer comprising;

a) a housing with a proximal end and a distal end having a compartment therein for storing various items;
b) a door hinged to said housing for covering the compartment;
c) means for sealing said door when said door is in a closed position on said housing to prevent moisture and dust from entering the compartment;
d) means for locking said door when said door is in the closed position on said housing to prevent unauthorized entry into the compartment;
e) a handle mounted to one side of said housing so that said body trailer can be carried by a person;
f) a pair of wheels mounted by an axle on the distal end of said housing and an auxiliary wheel mounted under the proximal end of said housing so that said body trailer can be towed in a horizontal position on the ground; and
g) means mounted on the proximal end of said housing for towing said body trailer behind the person, with said wheels rolling along said towing means including;
  i) a locking ratchet bracket connected to the bottom of the proximal end of said housing; and
  ii) and an elongate arm having a bent proximal end and a straight distal end connected to said locking ratchet bracket for movement between a collapsed position in which it extends rearwardly adjacent the bottom of the container with the gripping end adjacent the distal end and an erect, towing position, extending forwardly beyond the proximal end so that the person can grip the bent proximal end of said elongate arm for towing said trailer body.

2. A body trailer as recited in claim 1, further including:
  a) a foot on the distal end of said housing so that when said housing is placed in a vertical position, said foot will rest on the ground to stabilize said housing; and
  b) a collapsible table hinged to said housing opposite from said door, so that when said housing is placed in the vertical position said table can be opened to be utilized therefrom.

3. A body trailer as recited in claim 2, wherein said towing means includes:
  a) an eye affixed to the top of the distal end of said housing; and
  b) a lanyard connected to said eye so that the person can grip the lanyard for towing said trailer body on the ground.

4. A body trailer as recited in claim 3, wherein said towing means further includes a belt having a sleeve and a quick release buckle thereon, wherein the sleeve receives the bent proximal end of said elongated arm while the quick release buckle can be placed in engagement when said belt is placed about the waist of the person so that the person can tow said trailer body while their hands are kept free.

* * * * *